United States Patent
Hirano et al.

(10) Patent No.: US 8,755,792 B2
(45) Date of Patent: Jun. 17, 2014

(54) VEHICULAR COMMUNICATION APPARATUS AND VEHICULAR COMMUNICATION SYSTEM

(75) Inventors: Hiroyuki Hirano, Anjo (JP); Yoshitaka Ozaki, Okazaki (JP)

(73) Assignee: Denso Corporation, Kariya (JP)

( * ) Notice: Subject to any disclaimer, the term of this patent is extended or adjusted under 35 U.S.C. 154(b) by 212 days.

(21) Appl. No.: 13/494,137

(22) Filed: Jun. 12, 2012

(65) Prior Publication Data

US 2012/0322441 A1    Dec. 20, 2012

(30) Foreign Application Priority Data

Jun. 17, 2011    (JP) .................................. 2011-135170

(51) Int. Cl.
*H04W 4/00*    (2009.01)

(52) U.S. Cl.
USPC ........ 455/426.1; 455/457; 455/41.3; 701/533

(58) Field of Classification Search
USPC ................. 455/426.1, 457, 41.3; 701/533
See application file for complete search history.

(56) References Cited

U.S. PATENT DOCUMENTS

| | | | |
|---|---|---|---|
| 8,442,768 B2 * | 5/2013 | Sasaki ........................... | 701/533 |
| 8,532,678 B2 * | 9/2013 | Geelen .......................... | 455/457 |
| 2009/0271463 A1 | 10/2009 | Nariyoshi et al. | |

FOREIGN PATENT DOCUMENTS

| | | |
|---|---|---|
| JP | 2002-288172 | 10/2002 |
| JP | 2004-248042 | 9/2004 |
| JP | 2009-265961 | 11/2009 |

OTHER PUBLICATIONS

Office action dated Apr. 9, 2013 in corresponding Japanese Application No. 2011-135170.

* cited by examiner

*Primary Examiner* — Sharad Rampuria
*Assistant Examiner* — Shahriar Behnamian
(74) *Attorney, Agent, or Firm* — Harness, Dickey & Pierce, PLC (57) ABSTRACT

A vehicular communication apparatus communicably connected to a portable communication terminal, includes: an information acquisition device that acquires facility information about a facility from the portable communication terminal; an information storage device that controls a storage to store the facility information in association with the portable communication terminal; and an information display device that controls a display to display the facility information stored in the storage when the portable communication terminal providing the facility information is reconnected to the vehicular communication apparatus, and that controls the display not to display the facility information stored in the storage when a new portable communication terminal different from the portable communication terminal providing the facility information is connected to the vehicular communication apparatus.

4 Claims, 3 Drawing Sheets

VEHICULAR COMMUNICATION APPARATUS AND VEHICULAR COMMUNICATION SYSTEM

CROSS REFERENCE TO RELATED APPLICATION

This application is based on Japanese Patent Application No. 2011-135170 filed on Jun. 17, 2011, the disclosure of which is incorporated herein by reference.

TECHNICAL FIELD

The present disclosure relates to a vehicular communication apparatus for acquiring information from a portable communication terminal when connected and a vehicular communication system including the vehicular communication apparatus.

BACKGROUND

According to a recent technology (e.g., see patent document 1), a vehicle is mounted with a communication apparatus having the short range communication function. The communication apparatus wiredly or wirelessly connects with a portable communication terminal (e.g., mobile telephone). Various information stored in the portable communication terminal is transmitted to the communication apparatus on the vehicle. The information transmitted from the portable communication terminal to the vehicular communication apparatus includes POI (Point Of Interface) information about various facilities, for example. The information can be used as a destination or a route point configured for route guidance of a navigation system, for example.

Patent Document 1: JP-A-2004-248042

As mentioned above, the information transmitted from the portable communication terminal to the vehicular communication apparatus is stored in the portable communication terminal. The information depends on preferences and behavioral patterns attributed to an owner of the portable communication terminal. The information can be also considered to be private information. There is a demand for preventing another person from accessing the private information, that is, the information transmitted from the owner's portable communication terminal to the vehicular communication apparatus.

SUMMARY

It is an object of the present disclosure to provide a vehicular communication apparatus capable of protecting information transmitted from the portable communication terminal to the vehicular communication apparatus against another person and to provide a vehicular communication system including the vehicular communication apparatus.

According to a first aspect of the present disclosure, a vehicular communication apparatus communicably connected to a portable communication terminal, includes: an information acquisition device that acquires facility information about a facility from the portable communication terminal; an information storage device that controls a storage to store the facility information in association with the portable communication terminal; and an information display device that controls a display to display the facility information stored in the storage when the portable communication terminal providing the facility information is reconnected to the vehicular communication apparatus, and that controls the display not to display the facility information stored in the storage when a new portable communication terminal different from the portable communication terminal providing the facility information is connected to the vehicular communication apparatus.

In the above apparatus, the facility information stored in the storage is displayed only when the portable communication terminal corresponding to the facility information is reconnected to the vehicular communication apparatus. The facility information is not displayed even when a new portable communication terminal different from the portable communication terminal corresponding to the facility information is connected to the vehicular communication apparatus. This enables to protect information (especially the facility information about a facility in this case) transmitted from the portable communication terminal to the vehicular communication apparatus against another person who owns a new portable communication terminal different from that portable communication terminal.

According to a second aspect of the present disclosure, a vehicular communication system includes: a portable communication terminal; and a vehicular communication apparatus communicably connected to the portable communication terminal. The portable communication terminal includes: a facility information holding device that acquires facility information about a facility from an external information source and holds the facility information; and a facility information transmission device that transmits the facility information to the vehicular communication apparatus. The vehicular communication apparatus includes: an information acquisition device that acquires the facility information from the portable communication terminal; an information storage device that controls a storage to store the facility information in association with the portable communication terminal; and an information display device that controls a display to display the facility information stored in the storage when the portable communication terminal providing the facility information is reconnected to the vehicular communication apparatus, and that controls the display not to display the facility information stored in the storage when a new portable communication terminal different from the portable communication terminal providing the facility information is connected to the vehicular communication apparatus.

In the above system, the facility information stored in the storage is displayed only when the portable communication terminal corresponding to the facility information is reconnected to the vehicular communication apparatus. The facility information is not displayed even when a new portable communication terminal different from the portable communication terminal corresponding to the facility information is connected to the vehicular communication apparatus. This enables to protect information (especially the facility information about a facility in this case) transmitted from the portable communication terminal to the vehicular communication apparatus against another person who owns a new portable communication terminal different from that portable communication terminal.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION (First Embodiment)

With reference to the accompanying drawings, the following describes an embodiment applied to a vehicular communication apparatus compliant with Bluetooth (trademark, hereinafter referred to as BT) provided with a BT communication function as a short range wireless communication function. The embodiment assumes the following. The vehicular communication apparatus is mounted in a vehicle compartment. A BT-compliant mobile telephone (hereinafter referred to simply as a mobile telephone) provided with the BT communication function is carried into the vehicle compartment. The vehicular communication apparatus is capable of BT communication (short range wireless communication) with the mobile telephone.

Figure 1:
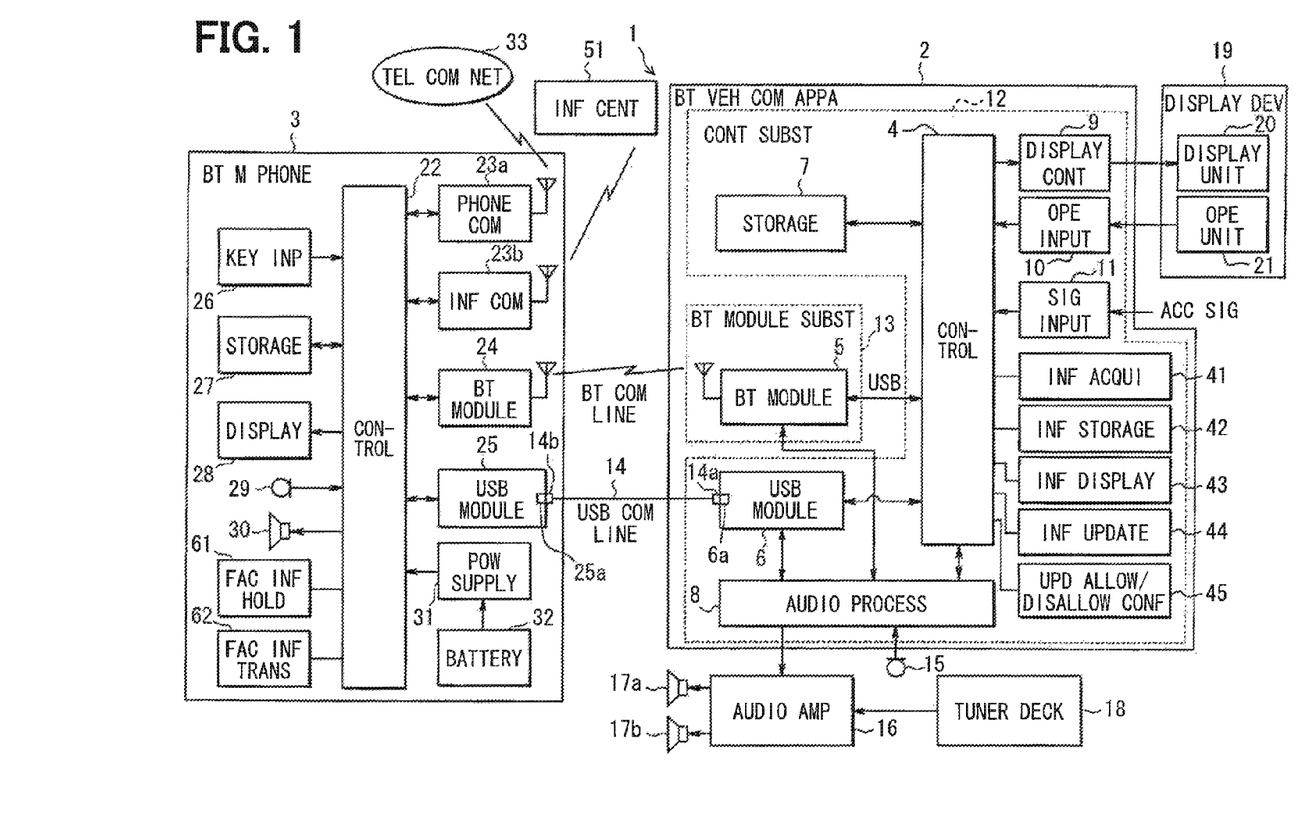
FIG. 1 is a function block diagram showing an embodiment of the present disclosure.

A BT communication system 1 is equivalent to the vehicular communication system. The BT communication system 1 includes a vehicular communication apparatus 2 and a mobile telephone 3. The vehicular communication apparatus 2 is mounted on a vehicle. The mobile telephone 3 is carried into the vehicle compartment and is equivalent to the portable communication terminal The vehicular communication apparatus 2 includes a control portion 4, a BT module 5, a USB (Universal Serial Bus) module 6, a storage portion 7, an audio processing portion 8, a display control portion 9, an operation input portion 10, and a signal input portion 11. The control portion 4, the USB module 6, the storage portion 7, the audio processing portion 8, the display control portion 9, the operation input portion 10, and the signal input portion 11 are physically mounted on a control substrate 12. The BT module 5 is physically mounted on a BT module substrate 13 that is provided as a member different from the control substrate 12. The control portion 4 and the BT module 5 each have a USB interface and are connected to each other through a USB communication line.

The control portion 4 is provided as a known computer including a CPU, RAM, ROM, and an I/O bus. The control portion 4 controls overall operations such as communication operations and data management operations for the vehicular communication apparatus 2. The control portion 4 executes a control program in the CPU to virtually implement an information acquisition portion 41, an information storage portion 42, an information display portion 43, an information update portion 44, and an update allowance/disallowance confirmation portion 45 as software.

The BT module 5 has a function that performs BT communication with a BT module of the mobile telephone 3 (to be described) through a BT communication line. The BT module 5 can simultaneously connect multiple profiles (multi-connection) specified in the BT communication standard. The profiles signify communication protocols defined for the corresponding functions. For example, the profiles include: SPP (Serial Port Profile) that specifies data communication available for virtual serial ports; HFP (Hands Free Profile) that specifies hands-free conversation; PBAP (Phone Book Access Profile) that specifies phone book data transfer; OPP (Object Push Profile) that also specifies phone book data transfer; A2DP (Advanced Audio Distribution Profile) that specifies audio data transfer; AVRCP (Audio/Video Remote Control Profile) that specifies transfer of control data concerning audio data control; DUN (Dial-up Networking Profile) that specifies dial-up connection to the Internet; and MAP (Message Access Profile) that specifies e-mail data. The BT module 5 and the BT module of the mobile telephone 3 (to be described) can exchange various information such as POI information with each other using the BT communication line.

The USB module 6 has a connection terminal 6a attachable to and detachable from one connection terminal 14a of a USB connection cable 14. One connection terminal 14a of the USB connection cable is connected to the connection terminal 6a and the other connection terminal 14b of the USB connection cable is connected to a USB module connection terminal of the mobile telephone 3 (to be described). In this state, the USB module 6 connects the USB communication line with the USB module of the mobile telephone 3 and enables USB communication using the USB communication line. The USB module 6 and the USB module of the mobile telephone 3 (to be described) can exchange various information such as POI information with each other using the USB communication line.

The storage portion 7 is configured as a non-volatile storage medium such as a hard disk drive and includes a storage area that stores various data.

The audio processing portion 8 connects with a microphone 15 that is provided in the vehicle compartment and is positioned near a steering unit where the voice uttered from a user can be easily collected, for example. The audio processing portion 8 also connects with an audio amplifier 16 provided outside the vehicular communication apparatus 2. The audio amplifier 16 connects with speakers 17a and 17b.

It is assumed that the BT communication line is connected between the BT module 5 and the BT module of the mobile telephone 3 (to be described). In this state, when the microphone 15 inputs the voice uttered from the user as transmission voice data, the audio processing portion 8 processes the input transmission voice data and outputs the processed data to the BT module 5. When the BT module 5 inputs reception voice data, the audio processing portion 8 outputs the input reception voice data to the audio amplifier 16.

The audio amplifier 16 is supplied with the reception voice data or audio data from the audio processing portion 8. The audio amplifier 16 then amplifies the supplied reception voice data or audio data and outputs it from the speakers 17a and 17b. The audio amplifier 16 also connects with a tuner deck 18. The tuner deck 18 supplies music sound reproduced from a music recording medium or a radio program received from a radio broadcasting station. The audio amplifier 16 amplifies the supplied music sound or radio program and outputs it from the speakers 17a and 17b.

A display apparatus 19 includes a display unit 20 and an operation unit 21. The display unit 20 displays various display screens. The operation unit 21 forms a touch switch on the display screen. In this case, the operation unit 21 provides a screen of the display apparatus 19 with a POI information acquisition switch for acquiring (downloading) POI information from a mobile telephone. When supplied with a display instruction signal from the control portion 4, the display control portion 9 controls display operations of the display unit 20 in the display apparatus 19 based on the supplied display instruction signal. The operation input portion 10 is supplied with an operation detection signal from the operation unit 21 when a user operates a touch switch formed on the display screen. The operation input portion 10 outputs the supplied operation detection signal to the control portion 4. The control portion 4 analyzes the operation detection signal supplied from the operation input portion 10 and specifies the user operation.

The signal input portion 11 is connected to an ACC (accessory) switch mounted on the vehicle. The signal input portion 11 is supplied with an ACC signal supplied from the ACC switch and outputs the supplied ACC signal to the control portion 4. The control portion 4 turns on or off an apparatus power supply based on the ACC signal supplied from the signal input portion 11. That is, the control portion 4 turns on the apparatus power supply (to start the vehicular communication apparatus 2) when the ACC signal changes from the off-state to the on-state. The control portion 4 turns off the apparatus power supply (to stop the vehicular communication apparatus 2) when the ACC signal changes from the on-state to the off-state.

When the storage portion 7 uses a volatile recording medium, the storage contents are deleted each time the ACC signal turns off (to stop the vehicular communication apparatus 2). As will be described later in detail, the POI information stored in the storage portion 7 is deleted each time the ACC signal turns off (to stop the vehicular communication apparatus 2). Consequently, the POI information needs to be downloaded each time the ACC signal turns on (to start the vehicular communication apparatus 2). In this case, the POI information to be downloaded might contain many facilities or a large amount of data and accordingly increase the data communication quantity on the communication line. In consideration of this, the storage portion 7 according to the embodiment uses a non-volatile recording medium. However, this is not intended to completely exclude a non-volatile recording medium for the storage portion 7.

A mobile telephone is connected to the vehicular communication apparatus 2 via the BT communication line or the USB communication line. The information acquisition portion 41 then acquires (downloads) the POI information and identification information about the mobile telephone from it via the BT communication line or the USB communication line. The identification information contains identification codes such as a telephone number allocated to the mobile telephone and a manufacturing number given to the same. The vehicular communication apparatus 2 uses the identification information acquired from the mobile telephone to identify the mobile telephone as an origin of transmitting the POI information.

The information acquisition portion 41 acquires (downloads) the POI information from the mobile telephone as described above. The information storage portion 42 then stores the POI information in the storage portion 7 so as to maintain one-to-one correspondence with the mobile telephone (identification information about the mobile telephone). That is, the storage portion 7 stores the POI information using one storage area for the POI information downloaded from one mobile telephone. The POI information stored in the storage portion 7 can be used as a destination or a route point configured for route guidance of a navigation system, for example.

When the vehicular communication apparatus 2 connects with the mobile telephone corresponding to the information stored in the storage portion 7, the information display portion 43 allows the display apparatus 19 (display unit 20) as a display portion to display the information (stored in the storage portion 7) in a list form.

The information update portion 44 can perform a process that updates (overwrites) the information stored in the storage portion 7.

The update allowance/disallowance confirmation portion 45 displays an update allowance/disallowance confirmation screen (not shown) on the display apparatus 19 (display unit 20). The update allowance/disallowance confirmation screen confirms whether to allow or disallow update of the information stored in the storage portion 7. For example, the update allowance/disallowance confirmation screen provides a message such as "overwrite information?" as well as a "YES" button to allow the information update (overwriting) and a "NO" button to disallow the same. A user can operate the "YES" button to allow the information update and operate the "NO" button to disallow the information update.

The following describes the configuration of the mobile telephone 3. The mobile telephone 3 includes a control portion 22, a telephone communication portion 23a, an information communication portion 23b, a BT module 24, a USB module 25, a key input portion 26, a storage portion 27, a display portion 28, a microphone 29, a speaker 30, and a power supply portion 31.

The control portion 22 includes a CPU, RAM, ROM, and an I/O bus used for a known microcomputer. The control portion 22 controls overall operations such as a communication operation and a data management operation of the mobile telephone 3. The control portion 22 executes a control program in the CPU to virtually implement a facility information holding portion 61 and a facility information transmission portion 62 as software. The telephone communication portion 23a performs telephone communication with a telephone communication network 33. The telephone communication network 33 includes facilities such as a mobile telephone base station and a base station control apparatus that provide known mobile telephone communication services.

The information communication portion 23b performs various types of information communication with an external information source, i.e., an external information center 51 via a wide area communication network. The information center 51 stores the most recent version of the information. The mobile telephone 3 can acquire (download) various information from the information center 51 via the information communication portion 23b. In this case, the information the mobile telephone 3 acquires (downloads) from the information center 51 contains at least one piece of POI (Point Of Interface) information about facilities such as a shop, a factory, and a part, that is, information about names and locations of the facilities.

The BT module 24 has a function that performs BT communication with the BT module 5 of the vehicular communication apparatus 2 via the BT communication line, The BT module 24 can simultaneously connect with multiple profiles compliant with the BT communication standard.

The USB module 25 includes a connection terminal 25a attachable to and detachable from the other connection terminal 14b of the USB connection cable 14. It is assumed that one connection terminal 14a of the USB connection cable 14 is connected to the connection terminal 6a of the USB module 6 and the other connection terminal 14b of the USB connection cable 14 is connected to the connection terminal 25a. In this state, the USB module 25 connects the USB communication line with the USB module 6 of the vehicular communication apparatus 2 and performs USB communication using the USB communication line.

The key input portion 26 includes various keys the user can operate. When the user operates a key, the key input portion 26 outputs the corresponding operation detection signal to the control portion 22. The control portion 22 analyzes the operation detection signal supplied from the key input portion 26 and identifies the user operation. The storage portion 27 contains a storage area that stores various data. The storage portion 27 stores POI information downloaded from the information center 51 as well as identification information about the mobile telephone 3. The storage portion 27 of the mobile telephone 3 preferably uses a non-volatile storage medium but may use a volatile storage medium.

The display portion 28 includes a display unit such as a display device. The display portion 28 is supplied with a display instruction signal from the control portion 22 and displays various display screens based on the supplied display instruction signal. The microphone 29 inputs the voice uttered from a user as transmission voice. When the telephone communication portion 23*a* receives the voice from an intended party, the speaker 30 outputs the voice as reception voice. The power supply portion 31 supplies the power discharged from a battery 32 as operating power to respective function blocks. The battery 32 is attachable to and detachable from the mobile telephone body.

The facility information holding portion 61 acquires POI information from the information center 51 as an external information source via the information communication portion 23*b*. The facility information holding portion 61 holds (stores) the POI information in the storage portion 27.

The facility information transmission portion 62 transmits the POI information stored in the storage portion 27 to the vehicular communication apparatus 2 via the BT communication line or the USB communication line.

As described above, the USB communication line is connected between the USB modules 6 and 25 and the BT communication line is connected BT modules 5 and 24. In this state, the mobile telephone 3 as a communication party of the vehicular communication apparatus 2 uses the USB communication line and the BT communication line as multiple resources for transmitting the POI information to the vehicular communication apparatus 2. The mobile telephone 3 receives a POI information output start request command from the vehicular communication apparatus 2. The POI information output start request command requests initiation of POI information output. The mobile telephone 3 then uses any one of the USB communication line and the BT communication line as resources to transmit the POI information to the vehicular communication apparatus 2.

When connected to each other via the communication line, the vehicular communication apparatus 2 and the mobile telephone 3 interoperate with each other while executing a linkage program installed in each of both. Accordingly, for example, the mobile telephone 3 can control an application performed on the vehicular communication apparatus 2. By contrast, the vehicular communication apparatus 2 can control an application performed on the mobile telephone 3. An application performed on the vehicular communication apparatus 2 can be output from the display portion 28 or the speaker 30 of the mobile telephone 3. By contrast, an application performed on the mobile telephone 3 can be output from the display device 19 or the speakers 17*a* and 17*b* of the vehicular communication apparatus 2.

Figure 2:
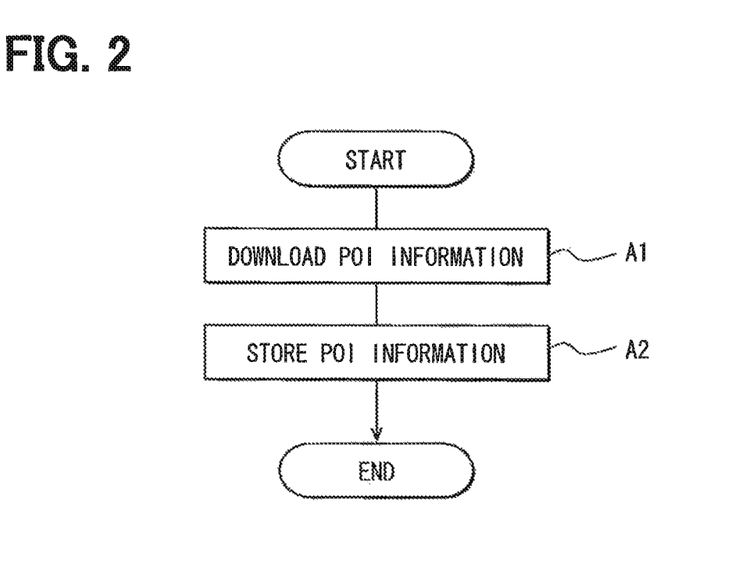
FIG. 2 is a flowchart showing operations of a mobile telephone.
Figure 3:
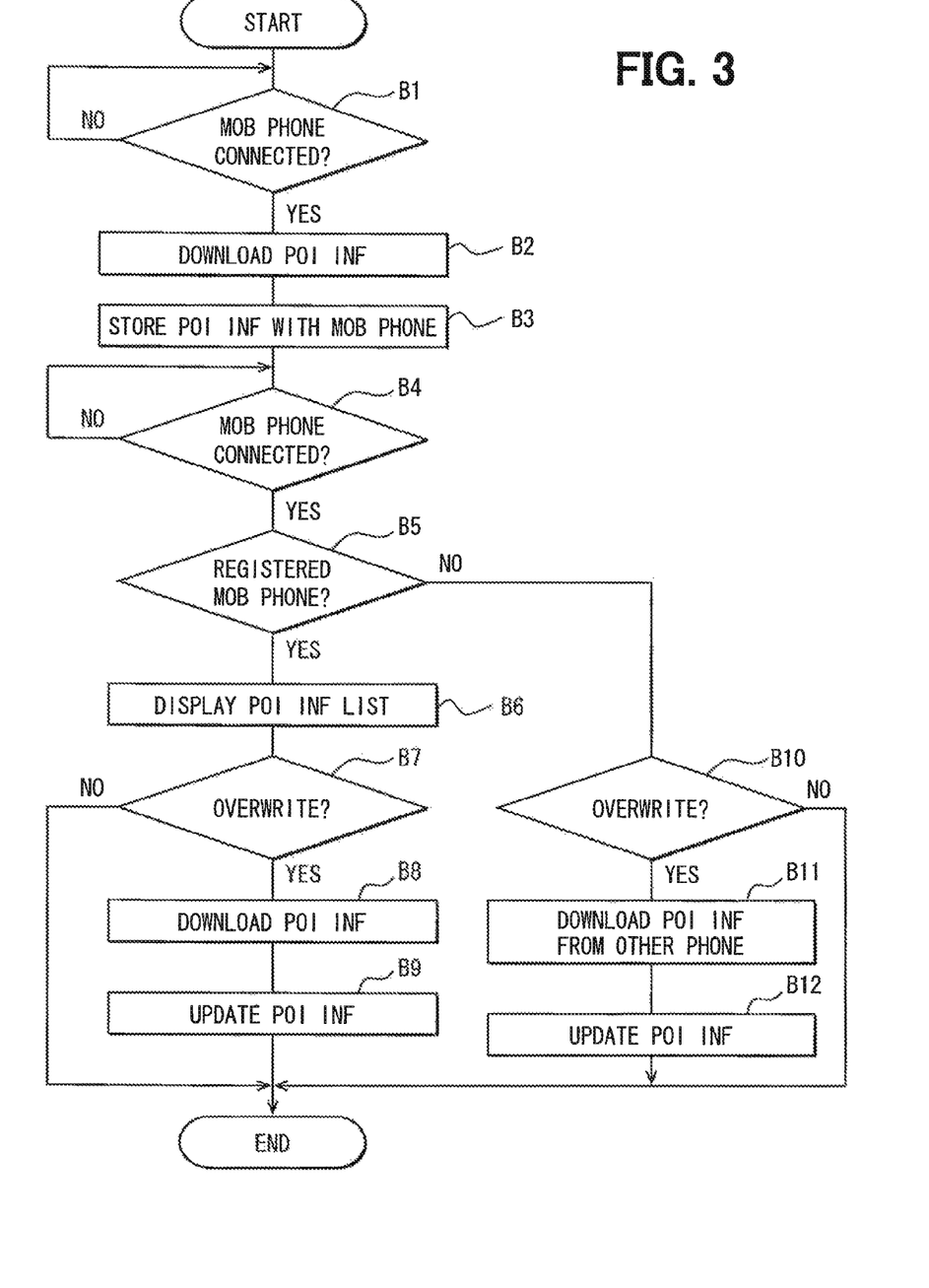
FIG. 3 is a flowchart showing operations of the vehicular communication apparatus.

With reference to FIGS. 2 and 3, the following describes the above-mentioned operations.

FIG. 2 shows operations on the mobile telephone 3. The control portion 22 of the mobile telephone 3 acquires (downloads) POI information from the information center 51 in accordance with a user operation on the key input portion 26 (step A1). The control portion 22 stores the acquired POI information in the storage portion 27 (step A2).

FIG. 3 shows operations on the vehicular communication apparatus 2. The control portion 4 of the vehicular communication apparatus 2 checks when the mobile telephone is connected to the vehicular communication apparatus 2 (step B1). When the mobile telephone (mobile telephone 3 in this case) is connected (YES at step B1), the control portion 4 acquires (downloads) POI information and identification information about the mobile telephone 3 from the mobile telephone 3 in accordance with a user operation on a touch switch (POT information acquisition switch) of the display device 19 (operation unit 21) (step B2). The control portion 4 stores the acquired POI information in the storage portion 7 in association with the mobile telephone (mobile telephone 3 in this case) as an origin of transmitting the POI information (step B3). The acquired identification information specifies that mobile telephone. In this case, it may be preferable that the control portion 4 also stores the POI information in the storage portion 7 in association with the identification information about the mobile telephone 3.

After transmitting the POI information, the control portion 22 of the mobile telephone 3 prevents the stored POI information from being deleted from the storage portion 27 of the mobile telephone 3. The mobile telephone 3 that transmitted the POI information maintains the POI information of the same contents as those of the POI information transmitted to the vehicular communication apparatus 2. The user might carry the mobile telephone 3 into an unusual vehicle such as a rented car different from the vehicle mounted with the vehicular communication apparatus 2 to which the POI information was transmitted from the mobile telephone 3. Even in such a case, the user can transmit (download) the POI information maintained in the mobile telephone 3 to a vehicular communication apparatus mounted on the different vehicle.

The control portion 4 of the vehicular communication apparatus 2 acquires the POI information from one mobile telephone (mobile telephone 3 in this case) as described above. The control portion 4 configures that mobile telephone as a registered mobile telephone. The control portion 4 then checks when the mobile telephone (including the one other than the registered mobile telephone) is connected (step B4). When the mobile telephone is reconnected (YES at step B4), the control portion 4 checks when the connected mobile telephone is the registered mobile telephone (mobile telephone 3 in this case) (step B5).

When the connected mobile telephone is the registered mobile telephone (mobile telephone 3 in this case) (YES at step B5), the control portion 4 allows the display device 19 (display unit 20) to display a list of POI information stored in the storage portion 7 at that point, that is, the POI information acquired from the mobile telephone 3 as the registered mobile telephone at that point (step B6). The control portion 4 displays the update allowance/disallowance confirmation screen on the display device 19 and confirms whether to update (overwrite) the information stored in the storage portion 7 (step B7).

When the user allows the information update using the update allowance/disallowance confirmation screen (YES at step B7), the control portion 4 newly acquires (downloads) POI information from the currently connected mobile telephone (mobile telephone 3 as the registered mobile telephone in this case) (step B8). The control portion 4 updates the POI information stored in the storage portion 7 to the newly acquired POI information (step B9) and terminates the control. The vehicular communication apparatus 2 stores up-to-date POI information stored in the registered mobile telephone at the time each time the registered mobile telephone connects to the vehicular communication apparatus 2.

The control portion 4 may newly acquire all the POI information from the registered mobile telephone and update all the POI information stored in the storage portion 7. Alternatively, the control portion 4 may compare the POI information stored in the storage portion 7 of the vehicular communication apparatus 2 with the POI information stored in the storage portion 27 of the registered mobile telephone. The control portion 4 may then identify a difference between the POI information (a different part of the POI information), newly acquire the POI information difference, and partially update the POI information. At step B7, the user may disallow the information update using the update allowance/disallowance confirmation screen (NO at step B7). In this case, the control portion 4 keeps the POI information stored in the storage portion 7 at that time unchanged (without updating) and terminates the process.

At step B5, the connected mobile telephone is not the registered mobile telephone (mobile telephone 3 in this case). That is, a mobile telephone different from the registered mobile telephone is connected to the vehicular communication apparatus 2 (NO at step B5). In this case, the control portion 4 does not allow the display device 19 (display unit 20) to display a list of POI information stored in the storage portion 7 at that time. The control portion 4 allows the display device 19 to display the update allowance/disallowance confirmation screen and confirms whether to update (overwrite) the information stored in the storage portion 7 (step B10).

When the user allows the information update using the update allowance/disallowance confirmation screen (YES at step B10), the control portion 4 acquires (downloads) the POI information and identification information about the mobile telephone from this mobile telephone different from the registered mobile telephone (step B11). The control portion 4 configures the mobile telephone from which the new POI information is acquired (the one different from the originally registered mobile telephone) as a new registered mobile telephone. The control portion 4 updates the POI information stored in the storage portion 7 to the newly acquired POI information (step B12) and terminates the control.

Also in this case, the control portion 4 stores the newly acquired POI information in the storage portion 7 in association with the mobile telephone (the one different from the originally registered mobile telephone before the update) as an origin of transmitting the information. When the user does not allow the information update using the update allowance/disallowance confirmation screen (NO at step B10), the control portion 4 keeps the POI information stored in the storage portion 7 at that time unchanged (without updating) and terminates the process.

The POI information stored in the vehicular communication apparatus 2 is used as a destination or a route point for a navigation system, for example. To specify a destination, for example, the display device 19 may display a list of POI information and allow the user to select the destination.

Detail information about facilities contained in the POI information may be acquired from outside. In this case, the vehicular communication apparatus 2 (control portion 4) and the mobile telephone 3 (control portion 22) interoperate with each other while executing a linkage program installed in each of both. The mobile telephone 3 (control portion 22) acquires (downloads) detail information about the POI information (e.g., information about events held at a facility, business days of the facility, weather information around the facility, and parking information around the facility) from the outside information center 51. The vehicular communication apparatus 2 (control portion 4) acquires (downloads) the detail information from the mobile telephone 3 and displays the information on the display device 19.

As described above, the vehicular communication apparatus 2 (control portion 4) according to the embodiment connects with a mobile telephone and then allows the information acquisition portion 41 to acquire the POI information from the mobile telephone. The information acquisition portion 41 acquires the POI information about the mobile telephone from the same mobile telephone. The vehicular communication apparatus 2 allows the information storage portion 42 to store the acquired POI information in the storage portion 7 in association with that mobile telephone. Later on, the vehicular communication apparatus 2 might reconnect to the mobile telephone (registered mobile telephone) corresponding to the POI information stored in the storage portion 7. In such a case, the vehicular communication apparatus 2 allows the information display portion 43 to display the POI information stored in the storage portion 7.

The POI information stored in the storage portion 7 is displayed only when the vehicular communication apparatus 2 reconnects with the mobile telephone corresponding to the POI information, that is, the registered mobile telephone. The POI information is not displayed even when the vehicular communication apparatus 2 connects with a mobile telephone different from the registered mobile telephone. This enables to protect the POI information transmitted from the mobile telephone to the vehicular communication apparatus 2 against another person who owns a mobile telephone different from that mobile telephone.

A family may share one vehicle. A stranger may get in a company-owned car or a rented car, for example. The present disclosure is especially effective for a case where a stranger is supposed to get in one vehicle. This is because the disclosure aims to protect the POI information transmitted from the mobile telephone to the vehicular communication apparatus 2 against another person.

The vehicular communication apparatus 2 (control portion 4) can allow the information update portion 44 to update the POI information stored in the storage portion 7. The vehicular communication apparatus 2 (control portion 4) can allow or disallow the information update using the update allowance/disallowance confirmation screen displayed by the update allowance/disallowance confirmation portion 45. There may be a case where the vehicular communication apparatus 2 (control portion 4) connects with a mobile telephone different from the mobile telephone (registered mobile telephone) corresponding to the POI information stored in the storage portion 7 and the user allows the POI information update using the update allowance/disallowance confirmation screen. In such a case, the vehicular communication apparatus 2 (control portion 4) allows the information acquisition portion 41 to newly acquire the POI information from the different mobile telephone. The vehicular communication apparatus 2 (control portion 4) allows the information update portion 44 to update the information stored in the storage portion 7 to the POI information about the different mobile telephone the information acquisition portion 41 acquired from the different mobile telephone.

The vehicular communication apparatus 2 might connect with a mobile telephone different from the mobile telephone (registered mobile telephone) corresponding to the POI information originally stored in the storage portion 7. The user might allow the update of the original POI information (originally stored in the storage portion 7). In such a case, the storage portion 7 newly stores the POI information acquired from the different mobile telephone. The POT information transmitted from the different mobile telephone to the vehicular communication apparatus 2 can be subsequently protected against another person.

At step B5, the vehicular communication apparatus 2 (control portion 4) determines whether the connected mobile telephone is the registered mobile telephone. The control portion 4 may preferably perform the determination in consideration of the identification information about the mobile telephone. Depending on the determination result, the control portion 4 may determine whether to display the POI information. That is, the control portion 4 determines whether the connected mobile telephone has the same identification information as that stored in the storage portion 7. The control portion 4 displays the facility information stored in the storage portion 7 when the connected mobile telephone has the same identification information as the stored one. The control portion 4 does not display the facility information stored in the storage portion 7 when the connected mobile telephone does not have the same identification information as the stored one.

As described above, the facility information is stored and displayed in association with the mobile telephone identification information. This enables to accurately specify or determine a targeted mobile telephone and improve the processing accuracy.

The disclosure is not limited to the above-mentioned embodiment but is applicable to various embodiments within the spirit and scope of the disclosure. For example, the disclosure can be modified or enhanced as follows.

The disclosure can handle various information such as various audio information, text information, and image information as well as the POI information. In particular, it is effective to handle information that is stored in the portable communication terminal and is available for various apparatuses mounted on the vehicle.

The portable communication terminal is not limited to mobile telephones but is applicable to various mobile communication terminals.

The vehicular communication apparatus 2 can be configured as a mobile wireless apparatus attachable to and detachable from the vehicle as well as an onboard apparatus built into the vehicle.

The short range communication described in the embodiment is assumed to cover the distance in an ordinary vehicle compartment. A range of distances can be changed in accordance with various factors such as vehicle types, sizes, the communication performance of the vehicular communication apparatus 2, and that of the mobile telephone 3. The communication function appropriate for the range of distances can be used.

The above disclosure has the following aspects.

According to a first aspect of the present disclosure, a vehicular communication apparatus communicably connected to a portable communication terminal, includes: an information acquisition device that acquires facility information about a facility from the portable communication terminal; an information storage device that controls a storage to store the facility information in association with the portable communication terminal; and an information display device that controls a display to display the facility information stored in the storage when the portable communication terminal providing the facility information is reconnected to the vehicular communication apparatus, and that controls the display not to display the facility information stored in the storage when a new portable communication terminal different from the portable communication terminal providing the facility information is connected to the vehicular communication apparatus.

In the above apparatus, the facility information stored in the storage is displayed only when the portable communication terminal corresponding to the facility information is reconnected to the vehicular communication apparatus. The facility information is not displayed even when a new portable communication terminal different from the portable communication terminal corresponding to the facility information is connected to the vehicular communication apparatus. This enables to protect information (especially the facility information about a facility in this case) transmitted from the portable communication terminal to the vehicular communication apparatus against another person who owns a new portable communication terminal different from that portable communication terminal.

Alternatively, the information acquisition device may control the storage to store the facility information in association with identification information of the portable communication terminal. The information display device determines whether a connected portable communication terminal has identification information corresponding to the identification information stored in the storage. The information display device controls the display to display the facility information stored in the storage when the connected portable communication terminal has identification information corresponding to the identification information stored in the storage. The information display device controls the display not to display the facility information stored in the storage when the connected portable communication terminal has new identification information different from the identification information stored in the storage. In this case, the facility information is stored and displayed in association with the portable communication terminal identification information. This enables to accurately specify or determine a targeted portable communication terminal and improve the processing accuracy.

Alternatively, the information storage device may control to storage to store the facility information, which is acquired by the information acquisition device from only one portable communication terminal. The vehicular communication apparatus further includes: an information update device that updates the facility information stored in the storage; and an information update allowance device that allows and disallows the information update device to update the facility information. When the new portable communication terminal different from the portable communication terminal providing the facility information is connected to the vehicular communication apparatus, the information update allowance device allows the information update device to update the facility information so that the information acquisition device acquires new facility information from the new portable communication terminal, and the information update device updates the facility information stored in the storage to the new facility information acquired from the new portable communication terminal. In this case, the vehicular communication apparatus might connect with a new portable communication terminal different from the portable communication terminal corresponding to the facility information stored in the storage. The facility information stored in the storage might be allowed to be updated. In such a case, the storage newly stores the facility information acquired from the new portable communication terminal. The facility information transmitted from the new portable communication terminal to the vehicular communication apparatus can be subsequently protected against another person.

Alternatively, the information acquisition device may acquire the facility information from the portable communication terminal via a short range wireless communication. Thus, the portable communication terminal can be communicably connected to the vehicular communication apparatus via a wireless short range communication line such as a Bluetooth (registered trademark) communication line. The vehicular communication apparatus can allow the information acquisition portion to acquire the facility information from the portable communication terminal using short range wireless communication.

According to a second aspect of the present disclosure, a vehicular communication system includes: a portable communication terminal; and a vehicular communication apparatus communicably connected to the portable communication terminal. The portable communication terminal includes: a facility information holding device that acquires facility information about a facility from an external information source and holds the facility information; and a facility information transmission device that transmits the facility information to the vehicular communication apparatus. The vehicular communication apparatus includes: an information acquisition device that acquires the facility information from the portable communication terminal; an information storage device that controls a storage to store the facility information in association with the portable communication terminal; and an information display device that controls a display to display the facility information stored in the storage when the portable communication terminal providing the facility information is reconnected to the vehicular communication apparatus, and that controls the display not to display the facility information stored in the storage when a new portable communication terminal different from the portable communication terminal providing the facility information is connected to the vehicular communication apparatus.

In the above system, the facility information stored in the storage is displayed only when the portable communication terminal corresponding to the facility information is reconnected to the vehicular communication apparatus. The facility information is not displayed even when a new portable communication terminal different from the portable communication terminal corresponding to the facility information is connected to the vehicular communication apparatus. This enables to protect information (especially the facility information about a facility in this case) transmitted from the portable communication terminal to the vehicular communication apparatus against another person who owns a new portable communication terminal different from that portable communication terminal.

Alternatively, the facility information holding device may continue to hold the facility information acquired from the external information source even after the facility information transmission device transmits the facility information to the vehicular communication apparatus. In this case, the portable communication terminal that transmitted facility information to the vehicular communication apparatus maintains the facility information of the same contents as those of the facility information transmitted to the vehicular communication apparatus. A user might carry the portable communication terminal into an unusual vehicle such as a rented car. Even in such a case, the user can transmit (download) the facility information maintained in the portable communication terminal to a vehicular communication apparatus mounted on the different vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular communication apparatus communicably connected to a portable communication terminal, comprising:
   an information acquisition device that acquires facility information about a facility from the portable communication terminal;
   an information storage device that controls a storage to store the facility information, which is obtained from the portable communication terminal by the information acquisition device, in association with the portable communication terminal; and
   an information display device that controls a display to display the facility information stored in the storage when the portable communication terminal providing the facility information stored in the storage is reconnected to the vehicular communication apparatus, and that controls the display not to display the facility information stored in the storage when a new portable communication terminal different from the portable communication terminal providing the facility information is connected to the vehicular communication apparatus;
   an information update device that updates the facility information stored in the storage; and
   an information update allowance device that allows and disallows the information update device to update the facility information,
   wherein the information storage device controls the storage to store the facility information in association with identification information of the portable communication terminal,
   wherein the information storage device controls the storage to store the facility information, which is acquired by the information acquisition device from only one portable communication terminal,
   wherein the information display device determines whether a connected portable communication terminal has same identification information as the identification information stored in the storage,
   wherein the information display device controls the display to display the facility information stored in the storaqe when the information display device determines that the connected portable communication terminal has the same identification information as the identification information stored in the storage,
   wherein the information display device controls the display not to display the facility information stored in the storage when the information display device determines that the connected portable communication terminal does not have the same identification information as the identification information stored in the storage, and
   wherein, when the new portable communication terminal different from the portable communication terminal providing the facility information stored in the storage is connected to the vehicular communication apparatus, the information update allowance device allows the information update device to update the facility information so that the information acquisition device acquires new facility information from the new portable communication terminal, and the information update device updates the facility information stored in the storage to the new facility information acquired from the new portable communication terminal by the information acquisition device.

2. The vehicular communication apparatus according to claim 1,
   wherein the information acquisition device acquires the facility information from the portable communication terminal via a short range wireless communication.

3. A vehicular communication system comprising:
   a portable communication terminal; and
   a vehicular communication apparatus communicably connected to the portable communication terminal, wherein the portable communication terminal includes:
- a facility information holding device that acquires facility information about a facility from an external information source and holds the facility information; and
- a facility information transmission device that transmits the facility information to the vehicular communication apparatus, and wherein the vehicular communication apparatus includes:
- an information acquisition device that acquires the facility information from the portable communication terminal;
- an information storage device that controls a storage to store the facility information, which is obtained from the portable communication terminal by the information acquisition device, in association with the portable communication terminal; and
- an information display device that controls a display to display the facility information stored in the storage when the portable communication terminal providing the facility information stored in the storage is reconnected to the vehicular communication apparatus, and that controls the display not to display the facility information stored in the storage when a new portable communication terminal different from the portable communication terminal providing the facility information is connected to the vehicular communication apparatus;
- an information update device that updates the facility information stored in the storage; and
- an information update allowance device that allows and disallows the information update device to update the facility information, wherein the information storage device controls the storage to store the facility information in association with identification information of the portable communication terminal, wherein the information storage device controls the storage to store the facility information, which is acquired by the information acquisition device from only one portable communication terminal, wherein the information display device determines whether a connected portable communication terminal has same identification information as the identification information stored in the storage, wherein the information display device controls the display to display the facility information stored in the storaqe when the information display device determines that the connected portable communication terminal has the same identification information as the identification information stored in the storage, wherein the information display device controls the display not to display the facility information stored in the storage when the information display device determines that the connected portable communication terminal does not have the same identification information as the identification information stored in the storage, and wherein, when the new portable communication terminal different from the portable communication terminal providing the facility information stored in the storage is connected to the vehicular communication apparatus, the information update allowance device allows the information update device to update the facility information so that the information acquisition device acquires new facility information from the new portable communication terminal, and the information update device updates the facility information stored in the storage to the new facility information acquired from the new portable communication terminal by the information acquisition device.

4. The vehicular communication system according to claim 3,
wherein the facility information holding device continues to hold the facility information acquired from the external information source even after the facility information transmission device transmits the facility information to the vehicular communication apparatus.

* * * * *